US006703137B2

(12) United States Patent
Subramanian

(10) Patent No.: US 6,703,137 B2
(45) Date of Patent: Mar. 9, 2004

(54) SEGMENTED THERMAL BARRIER COATING AND METHOD OF MANUFACTURING THE SAME

(75) Inventor: Ramesh Subramanian, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 21 days.

(21) Appl. No.: 09/921,206

(22) Filed: Aug. 2, 2001

(65) Prior Publication Data

US 2003/0207079 A1 Nov. 6, 2003

(51) Int. Cl.[7] .......................... B32B 15/04; B32B 3/00; F03B 3/12

(52) U.S. Cl. ................ 428/469; 428/304.4; 428/312.2; 428/316.6; 428/699; 428/701; 428/702; 416/241 B

(58) Field of Search ................................ 428/632, 633, 428/304.4, 312.2, 316.6, 318.4, 319.1, 469, 699, 701, 702, 156, 141, 163; 416/241 B, 241 R

(56) References Cited

U.S. PATENT DOCUMENTS

| | | | |
|---|---|---|---|
| 967,009 A | | 2/1978 | Gale |
| 4,299,860 A | | 11/1981 | Schaefer et al. |
| 4,377,371 A | | 3/1983 | Wisander et al. |
| 4,457,948 A | | 7/1984 | Ruckle et al. |
| 4,537,793 A | | 8/1985 | Kehrer et al. |
| 4,884,820 A | | 12/1989 | Jackson et al. |
| 4,988,538 A | | 1/1991 | Horvei et al. |
| 5,073,433 A | | 12/1991 | Taylor |
| 5,216,808 A | | 6/1993 | Martus |
| 5,350,599 A | * | 9/1994 | Rigney et al. |
| 5,352,540 A | | 10/1994 | Schienle et al. |
| 5,409,741 A | | 4/1995 | Laude |
| 5,426,092 A | | 6/1995 | Ovshinsky et al. |
| 5,558,922 A | | 9/1996 | Gupta et al. |

(List continued on next page.)

FOREIGN PATENT DOCUMENTS

EP 0 286 410 A2 10/1988

OTHER PUBLICATIONS

Haddadi, A. et al. Crystalline Growth within Alumina and Zirconia Coatings with Coating Temperature Control During Spraying. Thermal Spray: Practical Solutions for Engineering Problems. C.C. Berndt (ed.). Materials Park, OH: ASM International, 1996. pp. 615–622 (no month).

Johner, G. et al. Experimental and Theoretical Aspects of Thick Thermal Barrier Coatings for Turbine Applications. Proceedings of the National Thermal Spray Conference, Orlando, FL, 1987. Ed. D.L. Houck, 1987, pp. 155–166 (no month).

Nerz, J.E. et al Taguchi Analysis of Thick Thermal Barrier Coatings. Thermal Spray Research and Applications, Proceedings 3$^{rd}$ National Thermal Spray Conference, Long Beach, CA, 1990. (no month).

*Primary Examiner*—Deborah Jones
*Assistant Examiner*—Jennifer McNeil

(57) ABSTRACT

A thermal barrier coating (18) having a less dense bottom layer (20) and a more dense top layer (22) with a plurality of segmentation gaps (28) formed in the top layer to provide thermal strain relief. The top layer may be at least 95% of the theoretical density in order to minimize the densification effect during long term operation, and the bottom layer may be no more than 95% of the theoretical density in order to optimize the thermal insulation and strain tolerance properties of the coating. The gaps are formed by a laser engraving process controlled to limit the size of the surface opening to no more than 50 microns in order to limit the aerodynamic impact of the gaps for combustion turbine applications. The laser engraving process is also controlled to form a generally U-shaped bottom geometry (54) in the gaps in order to minimize the stress concentration effect.

12 Claims, 2 Drawing Sheets

U.S. PATENT DOCUMENTS 5,562,998 A 10/1996 Strangman
5,576,069 A 11/1996 Chen et al.
5,595,791 A 1/1997 Baumgart et al.
5,652,044 A 7/1997 Rickerby
5,681,616 A 10/1997 Gupta et al.
5,705,231 A 1/1998 Nissley et al.
5,743,013 A 4/1998 Taylor et al.
5,780,171 A 7/1998 Nissley et al.
5,830,586 A 11/1998 Gray et al.
5,951,892 A 9/1999 Wolfla et al.
5,993,976 A 11/1999 Sahoo et al.
6,047,539 A 4/2000 Farmer
6,102,656 A 8/2000 Nissley et al.
6,168,833 B1 1/2001 Leushake et al.
6,224,963 B1 5/2001 Strangman

* cited by examiner

SEGMENTED THERMAL BARRIER COATING AND METHOD OF MANUFACTURING THE SAME

FIELD OF THE INVENTION

This invention relates generally to thermal barrier coatings for metal substrates and in particular to a strain tolerant thermal barrier coating for a gas turbine component and a method of manufacturing the same.

BACKGROUND OF THE INVENTION

It is known that the efficiency of a combustion turbine engine will improve as the firing temperature of the combustion gas is increased. As the firing temperatures increase, the high temperature durability of the components of the turbine must increase correspondingly. Although nickel and cobalt based superalloy materials are now used for components in the hot gas flow path, such as combustor transition pieces and turbine rotating and stationary blades, even these superalloy materials are not capable of surviving long term operation at temperatures sometimes exceeding 1,400 degrees C. In many applications a metal substrate is coated with a ceramic insulating material in order to reduce the service temperature of the underlying metal and to reduce the magnitude of the temperature transients to which the metal is exposed.

Thermal barrier coating (TBC) systems are designed to maximize their adherence to the underlying substrate material and to resist failure when subjected to thermal cycling. The temperature transient that exists across the thickness of a ceramic coating results in differential thermal expansion between the top and bottom portions of the coating. Such differential thermal expansion creates stresses within the coating that can result in the spalling of the coating along one or more planes parallel to the substrate surface. It is known that a more porous coating will generally result in lower stresses than dense coatings. Porous coatings also tend to have improved insulating properties when compared to dense coatings. However, porous coatings will densify during long term operation at high temperature due to diffusion within the ceramic matrix, with such densification being more pronounced in the top (hotter) layer of the coating than in the bottom (cooler) layer proximate the substrate. This difference in densification also creates stresses within the coating that may result in spalling of the coating.

A current state-of-the-art thermal barrier coating is yttria-stabilized zirconia (YSZ) deposited by electron beam physical vapor deposition (EB-PVD). The EB-PVD process provides the YSZ coating with a columnar microstructure having sub-micron sized gaps between adjacent columns of YSZ material, as shown for example in U.S. Pat. No. 5,562,998. The gaps between columns of such coatings provide an improved strain tolerance and resistance to thermal shock damage. Alternatively, the YSZ may be applied by an air plasma spray (APS) process. The cost of applying a coating with an APS process is generally less than one half the cost of using an EB-PVD process. However, it is extremely difficult to form a desirable columnar grain structure with the APS process.

It is known to produce a thermal barrier coating having a surface segmentation to improve the thermal shock properties of the coating. U.S. Pat. No. 4,377,371 discloses a ceramic seal device having benign cracks deliberately introduced into a plasma-sprayed ceramic layer. A continuous wave $CO_2$ laser is used to melt a top layer of the ceramic coating. When the melted layer cools and re-solidifies, a plurality of benign micro-cracks are formed in the surface of the coating as a result of shrinkage during the solidification of the molten regions. The thickness of the melted/re-solidified layer is only about 0.005 inch and the benign cracks have a depth of only a few mils. Accordingly, for applications where the operating temperature will extend damaging temperature transients into the coating to a depth greater than a few mils, this technique offers little benefit.

Special control of the deposition process can provide vertical micro-cracks in a layer of TBC material, as taught by U.S. Pat. Nos. 5,743,013 and 5,780,171. Such special deposition parameters may place undesirable limitations upon the fabrication process for a particular application.

U.S. Pat. No. 4,457,948 teaches that a TBC may be made more strain tolerant by a post-deposition heat treatment/quenching process which will form a fine network of cracks in the coating. This type of process is generally used to treat a complete component and would not be useful in applications where such cracks are desired on only a portion of a component or where the extent of the cracking needs to be varied in different portions of the component.

U.S. Pat. No. 5,681,616 describes a thick thermal barrier coating having grooves formed therein for enhance strain tolerance. The grooves are formed by a liquid jet technique. Such grooves have a width of about 100–500 microns. While such grooves provide improved stress/strain relief under high temperature conditions, they are not suitable for use on airfoil portions of a turbine engine due to the aerodynamic disturbance caused by the flow of the hot combustion gas over such wide grooves. In addition, the grooves go all the way to the bond coat and this can result in its oxidation and consequently lead to premature failure.

U.S. Pat. No. 5,352,540 describes the use of a laser to machine an array of discontinuous grooves into the outer surface of a solid lubricant surface layer, such as zinc oxide, to make the lubricant coating strain tolerant. The grooves are formed by using a carbon dioxide laser and have a surface opening size of 0.005 inch, tapering smaller as they extend inward to a depth of about 0.030 inches. Such grooves would not be useful in an airfoil environment, and moreover, the high aspect ratio of depth-to-surface width could result in an undesirable stress concentration at the tip of the groove in high stress applications.

It is known to use laser energy to cut depressions in a ceramic or metallic coating to form a wear resistant abrasive surface. Such a process is described in U.S. Pat. No. 4,884,820 for forming an improved rotary gas seal surface. A laser is used to melt pits in the surface of the coating, with the edges of the pits forming a hard, sharp surface that is able to abrade an opposed wear surface. Such a surface would be very undesirable for an airfoil surface. Similarly, a seal surface is textured by laser cutting in U.S. Pat. No. 5,951,892. The surface produced with this process is also unsuitable for an airfoil application. These patents are concerned with material wear properties of an wear surface, and as such, do not describe processes that would be useful for producing a TBC having improved thermal endurance properties.

BRIEF SUMMARY OF THE INVENTION

Accordingly, an improved thermal barrier coating and method of manufacturing a component having such a thermal barrier coating is needed for very high temperature applications, in particular for the airfoil portions of a combustion turbine engine.

A method of manufacturing a component for use in a high temperature environment is disclosed herein as including the steps of: providing a substrate having a surface; depositing a layer of ceramic insulating material on the substrate surface, the ceramic insulating material deposited to have a first void fraction in a bottom layer proximate the substrate surface and a second void fraction, less than the first void fraction, in a top layer proximate a top surface of the layer of ceramic insulating material; and directing laser energy toward the ceramic insulating material to segment the top surface of the layer of ceramic insulating material. The method may further include controlling the laser energy to form segments in the top surface of the layer of ceramic insulating material separated by gaps of no more than 50 microns or no more than 25 microns. The method may further include controlling the laser energy to form segments in the top surface of the layer of ceramic insulating material separated by gaps having a generally U-shaped bottom geometry.

A device adapted for use in a high temperature environment is described herein as comprising: a substrate having a surface; a layer of ceramic insulating material disposed on the substrate surface, the ceramic insulating material having a first void fraction in a bottom layer proximate the substrate surface and a second void fraction, less than the first void fraction, in a top layer proximate a top surface of the layer of ceramic insulating material; and a plurality of laser-engraved gaps bounding segments in the top surface of the layer of ceramic insulating material. The device may further comprise the gaps having a width at the surface of the layer of ceramic insulating material of no more than 50 microns or no more than 25 microns. The device may further comprises the gaps having a generally U-shaped bottom geometry.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
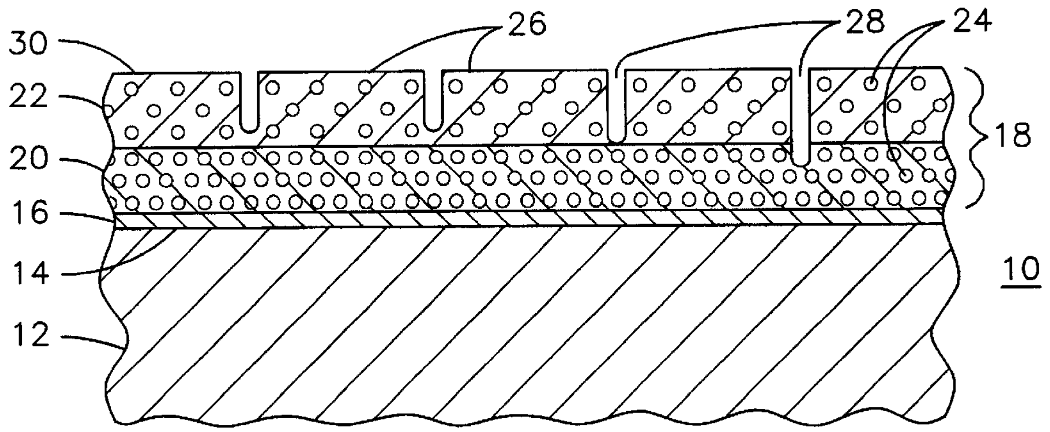
FIG. 1 is a partial cross-sectional view of a combustion turbine blade having a substrate material coated with a thermal barrier coating having two distinct layers of porosity, with the top layer being segmented by a plurality of laser-engraved gaps.

FIG. 1 illustrates a partial cross-sectional view of a component 10 formed to be used in a very high temperature environment. Component 10 may be, for example, the airfoil section of a combustion turbine blade or vane. Component 10 includes a substrate 12 having a top surface 14 that will be exposed to the high temperature environment. For the embodiment of a combustion turbine blade, the substrate 12 may be a superalloy material such as a nickel or cobalt base superalloy and is typically fabricated by casting and machining. The substrate surface 14 is typically cleaned to remove contamination, such as by aluminum oxide grit blasting, prior to the application of any additional layers of material. A bond coat 16 may be applied to the substrate surface 14 in order to improve the adhesion of a subsequently applied thermal barrier coating and to reduce the oxidation of the underlying substrate 12. Alternatively, the bond coat may be omitted and a thermal barrier coating applied directly onto the substrate surface 14. One common bond coat 16 is an MCrAlY material, where M denotes nickel, cobalt, iron or mixtures thereof, Cr denotes chromium, Al denotes aluminum, and Y denotes yttrium. Another common bond coat 16 is alumina. The bond coat 16 may be applied by any known process, such as sputtering, plasma spray processes, high velocity plasma spray techniques, or electron beam physical vapor deposition.

Next, a ceramic thermal barrier coating 18 is applied over the bond coat 16 or directly onto the substrate surface 14. The thermal barrier coating (TBC) may be a yttria-stabilized zirconia, which includes zirconium oxide $ZrO_2$ with a predetermined concentration of yttrium oxide $Y_2O_3$, pyrochlores, or other TBC material known in the art. The TBC is preferably applied using the less expensive air plasma spray technique, although other known deposition processes may be used. In a preferred embodiment, as illustrated in FIG. 1, the thermal barrier coating includes a first-applied bottom layer 20 and an overlying top layer 22, with at least the density being different between the two layers. Bottom layer 20 has a first density that is less than the density of top layer 22. In one embodiment, bottom layer 20 may have a density that is between 80–95% of the theoretical density, and top layer 22 may have a density that is at least 95% of the theoretical density. The theoretical density is a value that is known in the art or that may be determined by known techniques, such as mercury porosimetry or by visual comparison of photomicrographs of materials of known densities. The porosity and density of a layer of TBC material may be controlled with known manufacturing techniques, such as by including small amounts of void-forming materials such as polyester during the deposition process. The bottom layer 20 provides better thermal insulating properties per unit of thickness than does the top layer 22 as a result of the insulating effect of the pores 24. The bottom layer 20 is also relatively less susceptible to interlaminar failure (spalling) resulting from the temperature difference across the depth of the layer because of the strain tolerance provided by the pores 24 and because of the insulating effect of the top layer 22. The top layer 22 is less susceptible to densification and possible interlaminar failure resulting there from since it contains a relatively low quantity of pores 24, thus limiting the magnitude of the densification effect. The combination of a less dense bottom layer 20 and a more dense top layer 22 provides desirable properties for a high temperature environment. In other embodiments, the density of the thermal barrier coating may be graduated from a higher density proximate the top of the coating to a lower density proximate the bottom of the coating rather than changed at discrete layers.

The dense top layer 22 will have a relatively lower thermal strain tolerance due to its lower pore content. For the very high temperatures of some modern combustion turbine engines, there may be an unacceptable level of interlaminar stress generated in the top layer 22 in its as-deposited condition due to the temperature gradient across the thickness (depth) of that layer. Accordingly, the top layer 22 is segmented to provide additional strain relief in that layer, as illustrated in FIG. 1. A plurality of segments 26 bounded by a plurality of gaps 28 are formed in the top layer 22 by a laser engraving process. The gaps 28 allow the top layer 22 to withstand a large temperature gradient across its thickness without failure, since the expansion/contraction of the material can be at least partially relieved by changes in the gap sizes, which reduces the total stored energy per segment. The gaps 28 may be formed to extend to the full depth of the top layer 22, or to a greater or lesser depth as may be appropriate for a particular application. It is preferred that the gaps do not extend all the way to the bond coat 16 in order to avoid the exposure of the bond coat to the environment of the component 10. The selection of a particular segmentation strategy, including the size and shape of the segments and the depth of the gaps 28, will vary from application to application, but should be selected to result in a level of stress within the thermal barrier coating 18 which is within allowable levels at all depths of the TBC for the predetermined temperature environment. Importantly, the use of laser engraved segmentation permits the TBC to be applied to a depth greater than would otherwise be possible without such segmentation. Current technologies make use of ceramic TBC's with thicknesses of about 12 mils, whereas thicknesses of as much as 50 mils are anticipated with the processes described herein.

Figure 2:
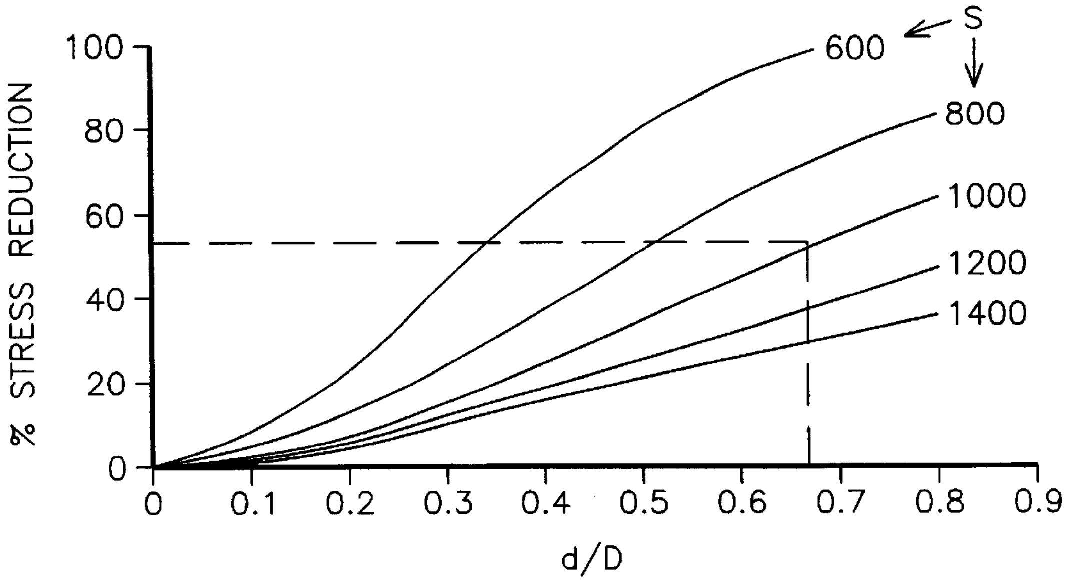
FIG. 2 is a graphical illustration of the reduction in stress on the surface of a thermal barrier coating as a function of the width, depth and spacing of segmentation gaps formed in the surface of the coating.

Known finite element analysis modeling techniques may be used to select an appropriate segmentation strategy. FIG. 2 illustrates the percentage of stress relief versus the ratio of the gap spacing to the gap depth for a typical TBC system using the following values for the properties of the coating and substrate: $E_{substrate}$=200 GPa, $E_{TBC}$=40 GPa, gap depth (d)=200 microns, gap centerline spacing (S)=1,000 microns, and coating thickness (D)=300 microns. FIG. 2 illustrates the percentage of stress relief (as a percentage of the stress for a similar component having no segmentation) at a point A on the surface of the TBC coating midway between two gaps as a function of the ratio of gap depth to TBC thickness (d/D) for each of several gap centerline spacing values (S). For example, as can be appreciated by examining the data plotted on FIG. 2, a gap spacing of S=1,000 microns is predicted to produce approximately a 50% reduction in the stress at point A for a gap extending approximately two thirds the depth of the coating.

Laser energy is preferred for engraving the gaps 28 after the thermal barrier coating 18 is deposited. The laser energy is directed toward the TBC top surface 30 in order to heat the material in a localized area to a temperature sufficient to cause vaporization and removal of material to a desired depth. The edges of the TBC material bounding the gaps 28 will exhibit a small re-cast surface where material had been heated to just below the temperature necessary for vaporization. The geometry of the gaps 28 may be controlled by controlling the laser engraving parameters. For turbine airfoil applications, the width of the gap at the surface 30 of the thermal barrier coating 18 may be maintained to be no more than 50 microns, and preferably no more than 25 microns. Such gap sizes will provide the desired mechanical strain relief while having a minimal impact on aerodynamic efficiency. Wider or more narrow gap widths may be selected for particular portions of a component surface, depending upon the sensitivity of the aerodynamic design and the predicted thermal conditions. The laser engraving process provides flexibility in for the component designer in selecting the segmentation strategy most appropriate for any particular area of a component. In higher temperature areas the gap opening width may be made larger than in lower temperature areas. A component may be designed and manufactured to have a different gap spacing (S) in different sections of the same component.

Figure 3A:
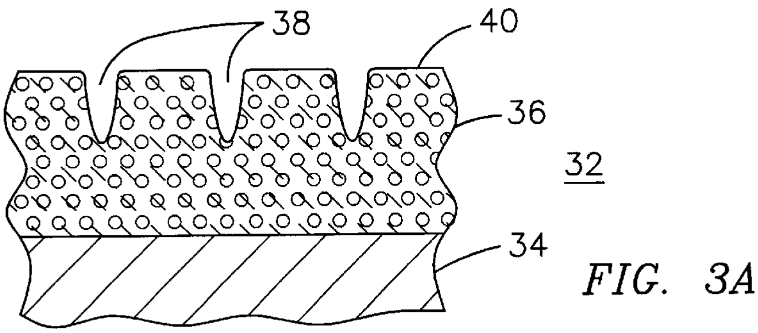
FIG. 3A is a partial cross-section view of a component having a laser-segmented ceramic thermal barrier coating.
Figure 3B:
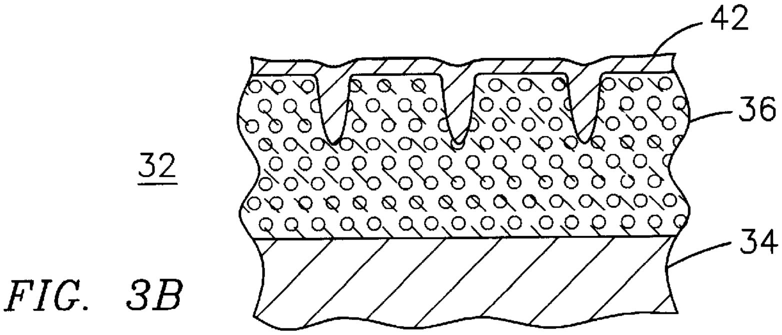
FIG. 3B is the component of FIG. 3A and having a layer of bond inhibiting material deposited thereon.
Figure 3C:
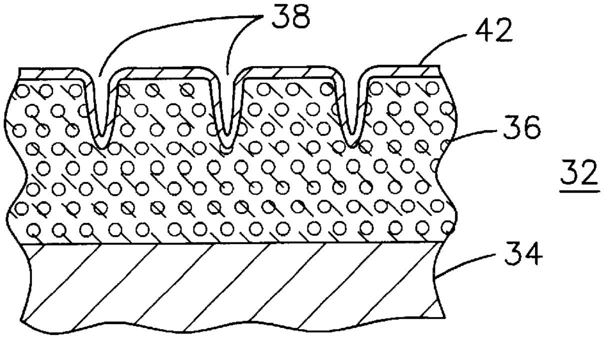
FIG. 3C is the component of FIG. 3B after the bond inhibiting material has been subjected to a thermal heat treatment process.

Furthermore, a bond inhibiting material, such as alumina or yttrium aluminum oxide, may be disposed within the gaps on the gap side walls in order to reduce the possibility of the permanent closure of the gaps by sintering during long term high temperature operation. FIGS. 3A–3C illustrate a partial cross-sectional view of a component part 32 of a combustion turbine engine during sequential stages of fabrication. A substrate material 34 is coated with a variable density ceramic thermal barrier coating 36 as described above. A plurality of gaps 38, as shown in FIG. 3A, are formed by laser engraving the surface 40 of the ceramic material. A layer of a bond inhibiting material 42 is deposited on the surface 40 of the ceramic, including into the gaps 38, by any known deposition technique, such as sol gel, CVD, PVD, etc. as shown in FIG. 3B. The amorphous state as-deposited bond inhibiting material 42 is then subjected to a heat treatment process as is known in the art to convert it to a crystalline structure, thereby reducing its volume and resulting in the structure of FIG. 3C. The presence of the bond inhibiting material 42 within the gaps 38 provides improved protection against the sintering of the material and a resulting closure of the gaps 38.

Figure 4A:
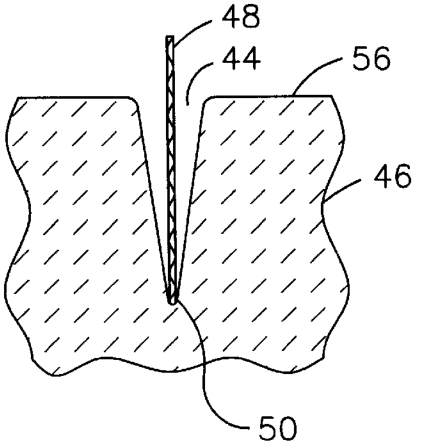
FIG. 4A is a cross-section view of a gap being cut into a ceramic material by a first pass of a laser having a first focal distance, the gap having a generally V-shaped bottom geometry.
Figure 4B:
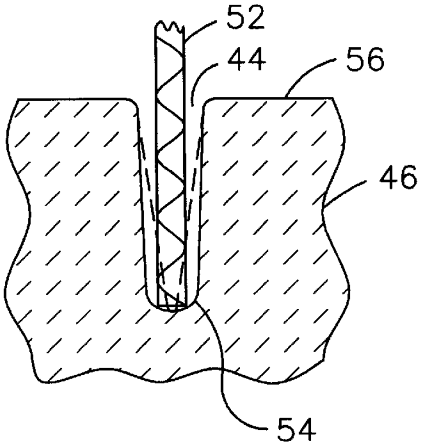
FIG. 4B is the gap of FIG. 4A being subjected to a second pass of laser energy having a focal distance greater than that used in the first pass of FIG. 4A to change the gap bottom geometry to a generally U-shape.

The inventors have found that it is preferred to use a YAG laser for engraving the gaps of the subject invention. A YAG laser has a wavelength of about 1.6 microns and will therefore serve as a finer cutting instrument than would a carbon dioxide laser which has a wavelength of about 10.1 microns. A power level of about 20–200 watts and a beam travel speed of between 5–600 mm/sec have been found to be useful for cutting a typical ceramic thermal barrier coating material. The laser energy is focused on the surface of the coating material using a lens having a focal distance of about 25–240 mm. Typically 2–12 passes across the surface may be used to form the desired depth of a continuous gap. The inventors have found that a generally U-shaped bottom geometry may be formed in the gap by making a second pass with the laser over an existing laser-cut gap, wherein the second pass is made with a wider beam footprint than was used for the first pass. The wider beam footprint may be accomplished by simply moving the laser farther away from the ceramic surface or by using a lens with a longer focal distance. In this manner the energy from the second pass will tend to penetrate less deeply into the ceramic but will heat and evaporate a wider swath of material near the bottom of the gap, thus forming a generally U-shaped bottom geometry rather than a generally V-shaped bottom geometry as may be formed with a first pass. This process is illustrated in FIGS. 4A and 4B. A gap 44 is formed in a layer of ceramic material 46. In FIG. 4A, a first pass of the laser energy 48 having a first focal distance and a first footprint size is used to cut the gap 44. Gap 44 after this pass of laser energy has a generally V-shaped bottom geometry 50. In FIG. 4B, a second pass of laser energy 52 having a second focal distance greater than the first focal distance and a second footprint size greater than the first footprint size is used to widen the bottom of gap 44 into a generally U-shaped bottom geometry 54. The dashed line in FIG. 4B denotes the gap shape from FIG. 4A, and it can be seen that the wider laser beam tends to evaporate material from along the walls of the gap 44 without significantly deepening the gap, thereby giving it a less sharp bottom geometry. The width of the gap 44 at the top surface 56 in FIG. 4A is wider than the width of the beam of laser energy 48 due to the natural convection of heat from the bottom to the top as the gap 44 is formed. Therefore, the width of beam 52 can be made appreciably wider than that of beam 48 without impinging onto the sides of the gap 44 near the top surface 56. Since the energy density of beam 52 is less than that of beam 48, the effect of beam 52 will be to remove more material from the sides of the gap 44 than from the bottom of the gap, thus rounding the bottom geometry somewhat. Such a U-shaped bottom geometry will result in a lower stress concentration at the bottom of the gap 44 than would a generally V-shaped geometry of the same depth.

The bottom geometry of the gap 44 may also be affected by the rate of pulsation of the laser beam 52. It is known that laser energy may be delivered as a continuous beam or as a pulsed beam. The rate of the pulsations may be any desired frequency, for example from 1–20 kHz. Note that this frequency should not be confused with the frequency of the laser light itself. For a given power level, a slower frequency of pulsations will tend to cut deeper into the ceramic material 46 than would the same amount of energy delivered with a faster frequency of pulsations. Accordingly, the rate of pulsations is a variable that may be controlled to affect the shape of the bottom geometry of the gap 44. In one embodiment, the inventors envision a first pass of the laser energy 48 having a first frequency of pulsations being used to cut the gap 44. Gap 44 after this pass of laser energy may have a generally V-shaped bottom geometry 50. A second pass of laser energy 52 having a second frequency of pulsations greater than the first frequency of pulsations is used to widen the bottom of gap 44 into a generally U-shaped bottom geometry 54. The dashed line in FIG. 4B denotes the gap shape from FIG. 4A, and it is expected that the more rapidly pulsed laser beam would tend to evaporate material from along the walls of the gap 44 without a corresponding deepening of the gap, thereby giving the gap a less sharp bottom geometry. The bottom geometry 54 may further be controlled by controlling a combination of laser beam footprint and pulsation frequency, as well as other cutting parameters.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims

I claim as my invention:

1. A device adapted for use in a high temperature environment, the device comprising:

a substrate having a surface;

a layer of ceramic insulating material disposed on the substrate surface, the layer of ceramic insulating material having a first as-deposited void fraction in a bottom portion proximate the substrate surface and a second as-deposited void fraction, less than the first as-deposited void fraction, in a top portion proximate a top surface of the layer of ceramic insulating material; and a plurality of segments having respective predetermined sizes and shapes defined by continuous gaps formed in the top surface of the layer of ceramic insulating material.

2. The device of claim 1, further comprising the gaps having a width at the surface of the layer of ceramic insulating material of no more than 50 microns.

3. The device of claim 1, further comprising the gaps having a width at the surface of the layer of ceramic insulating material of no more than 25 microns.

4. The device of claim 1, further comprising the gaps having a generally U-shaped bottom geometry.

5. The device of claim 1, further comprising the layer of ceramic insulating material having a second as-deposited void fraction of no more than 5%.

6. The device of claim 5, further comprising the layer of ceramic insulating material having a first as-deposited void fraction in the range of 5–20%.

7. The device of claim 1, wherein the gaps extend through a complete thickness of the top portion of the layer of ceramic insulating material but not to the substrate surface.

8. A device for use as an airfoil in a high temperature environment, the device comprising:

a substrate having a surface;

a layer of a ceramic insulating material disposed on the substrate surface; and a plurality of laser-engraved continuous gaps defining a plurality of segments having predetermined sizes and shapes in a top surface of the layer of ceramic insulating material, the gaps having a width at the top surface of no more than 50 microns and extending through only a portion of a thickness of the layer of ceramic insulating material but not to the substrate surface.

9. The device of claim 8, further comprising the gaps having a generally U-shaped bottom geometry.

10. The device of claim 8, further comprising the layer of ceramic insulating material having a first as-deposited void fraction in a bottom layer proximate the substrate surface and a second as-deposited void fraction, less than the first as-deposited void fraction, in a top layer proximate the top surface of the layer of ceramic insulating material.

11. The device of claim 8, wherein the substrate is a combustion turbine blade or vane.

12. The device of claim 8, wherein the ceramic insulating material comprises zirconium oxide or a pyrochlore.

* * * * *